Figure 1:
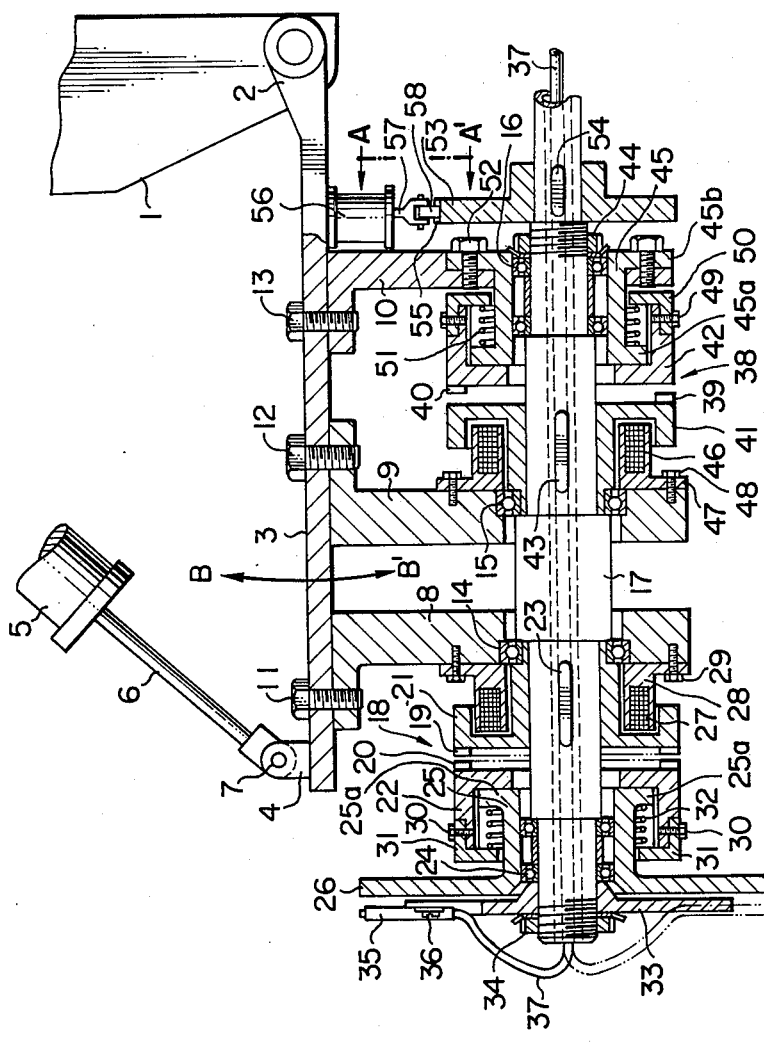

United States Patent [19]

Murata et al.

[11] 3,911,739

[45] Oct. 14, 1975

[54] APPARATUS FOR PRINTING A MARK ON A ROTATING TIRE

[75] Inventors: Junichi Murata; Yutaka Takasuga, both of Higashimurayama, Japan

[73] Assignee: Bridgestone Tire Company Limited, Tokyo, Japan

[22] Filed: Dec. 26, 1974

[21] Appl. No.: 536,616

[30] Foreign Application Priority Data
Dec. 28, 1973 Japan.................................. 49-2645

[52] U.S. Cl..................................... 73/146; 73/146
[51] Int. Cl.².......................................... G01M 17/02
[58] Field of Search . 73/146, 66; 33/143 D, 203.16, 33/203.19

[56] References Cited
UNITED STATES PATENTS
| | | | |
|---|---|---|---|
| 3,518,878 | 7/1970 | Landsness et al...................... | 73/146 |
| 3,526,131 | 9/1970 | Buser et al............................ | 73/146 |
| 3,631,716 | 1/1972 | Monajjem.............................. | 73/146 |

Primary Examiner—Donald O. Woodiel
Attorney, Agent, or Firm—Waters, Schwartz & Nissen

[57] ABSTRACT

An apparatus for printing a mark on a rotating vehicle tire which is under uniformity test by a uniformity measuring device. The mark is printed in the form of a point exactly at a position on the tire which has a peak value in the uniformity including a force variation or run-out. The apparatus comprises a rotary shaft, a first disc member securely mounted on the rotary shaft and carrying a marking means, a second disc freely rotatably mounted on the rotary shaft and adapted to be brought into pressing contact with a tire surface for rotation therewith, and a mechanism for transmitting rotational movement of the second disc member to the first disc member through the rotary shaft upon receipt of a signal from the measuring device for running the marking means at a speed same as the circumferential speed of the rotating tire. The apparatus further includes a means for holding the marking means in its stand-by position.

9 Claims, 2 Drawing Figures

U.S. Patent  Oct. 14, 1975  3,911,739

APPARATUS FOR PRINTING A MARK ON A ROTATING TIRE

This invention relates to an apparatus for printing a mark on a vehicle tire and more particularly to an apparatus for printing a mark on the surface of a rotating tire at a position having a peak value in uniformity including a force variation or run-out.

In an existing tire marking apparatus of the nature just mentioned, after measuring the uniformity, the rotation of a tire is stopped by a servo-mechanism to hold the tire in a predetermined stationary position for printing a mark on the tire surface at the point corresponding to a peak value in uniformity. An apparatus of this type requires approximately 10 seconds to measure and mark one tire and is thus extremely inefficient in its operation. There have also been proposed another type of apparatus, for example, in U.S. Pat. No. 3,518,878, where a marker is positioned in contact or in small gap relation with a sidewall of a rotating tire and oscillable substantially parallel to the direction of the travel of the tire sidewall. In an apparatus of the latter type, the movement of the marker is not synchronized with the peripheral speed of the marking surface, so that a mark made during the uniformity test will have a width due to inability of the marker to exactly follow the rotating movement of the marking surface, failing to indicate the peak position exactly by a point.

It is an object of the present invention to provide an apparatus for marking a tire, which overcomes the afore-mentioned shortcomings of the prior-art apparatus.

It is another object of the invention to provide an apparatus for marking a tire, which is simple in construction and efficient and reliable in operation.

It is a further object of the invention to provide an apparatus for marking a tire, which enables marking with high accuracy and facilitates adjustments of the accuracy.

It is a still further object of the invention to provide an apparatus for marking a rotating tire without reducing the speed or stopping the rotation of the tire.

According to the present invention, the above-noted objects are attained by an apparatus which comprises: a rotary shaft rotatably supported on a bracket, a first disc member securely mounted at one end of the rotary shaft for rotation therewith, a second disc member freely rotatably mounted on the rotary shaft inwardly of the first disc member and adapted to be brought into pressing contact with a tire under measurement, a marking means securely mounted on the first disc member and having the fore end thereof radially outwardly projected to assume a radial position corresponding to or slightly beyond the outer periphery of the second disc member, a first clutch means mounted on the rotary shaft for coupling the second disc member and the rotary shaft in response to a signal from the measuring device, a second clutch means mounted on the rotary shaft and the bracket for coupling the rotary shaft and the bracket when the marking means returns to a stand-by position on the first disc member, and a positioning means for holding the marking means in the stand-by position.

Figure 2:
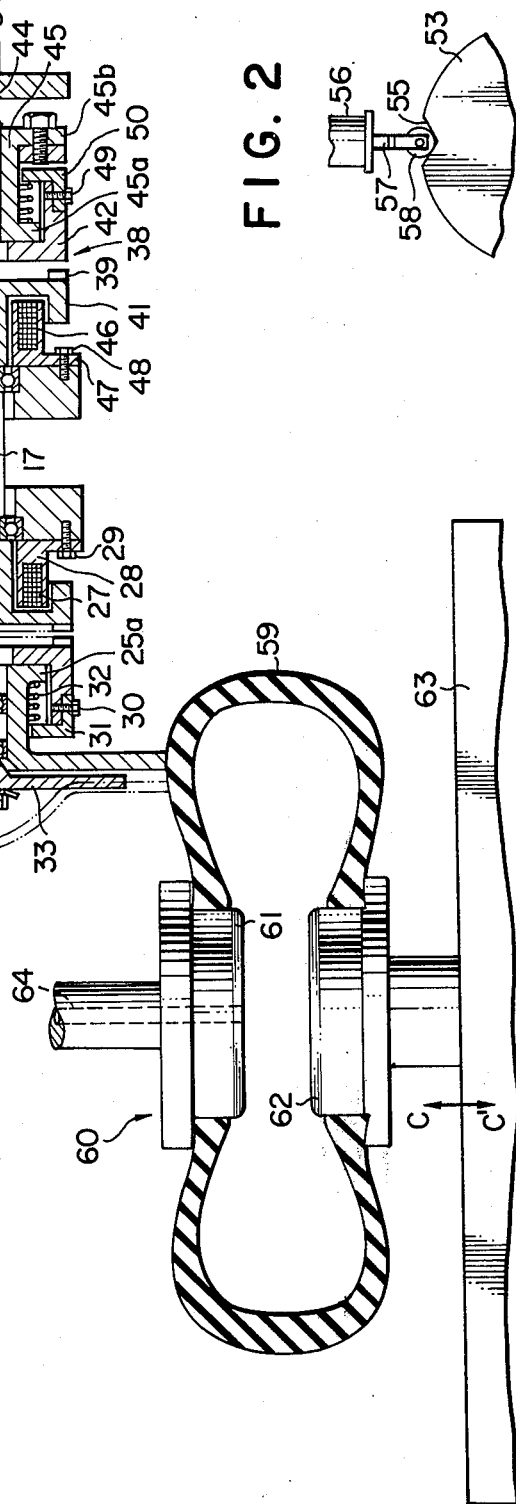

The above and other objects, features and advantages of the invention will become clear from the following particular description of the invention and the appended claims, taken in conjunction with the accompanying drawings which show by way of example a preferred embodiment of the present invention. In the accompanying drawings:

FIG. 1 is a cross-sectional view showing a preferred embodiment of an apparatus for making a mark on a tire according to the invention; and FIG. 2 is a fragmentary view as seen in the direction of arrows A and A' of FIG. 1.

Referring now to the accompanying drawings and first to FIG. 1, the apparatus according to the present invention includes a rocking plate 3 which is pivotally mounted at one end on a machine frame 1 by a pin 2 and is rockable about the pin 2 in the direction of arrows B and B'. The plate 3 has at the other end a bracket 4 which is pivotally connected by a pin 7 to an extended end of a piston rod 6 of a fluid operated cylinder 5. The cylinder 5 has its base end pivotally supported on the machine frame 1. The rocking plate 3 has three pendant brackets 8 to 10 securely fixed to the lower face thereof by means of bolts 11 to 13, respectively. The lower ends of the brackets 8 to 10 jointly support a hollow rotatable shaft 17 through bearings 14 to 16, respectively. A first clutch 18 comprises clutch members 21 and 22 having a plurality of coupling teeth 10 and 20 on their respective opposing faces. The clutch member 21 is keyed to the rotatable shaft 17 as at 23. The other clutch member 22 is supported on a flange 25a at the rear end of a sleeve 25 which is rotatably mounted on the rotatable shaft 17 through a bearing 24. The sleeve 25 has at the fore end a rotatable disc 26 which is formed as an integral part of the sleeve 25. The clutch member 21 has loosely mounted therearound an electromagnet support 28 which is fixedly supported on the first bracket 8 by bolts 29 to support an electromagnet 27 in small gap relation with the rear face of the clutch member 21. The inner surface of the clutch member 22 is splined to the peripheral surface of the flange 25a at the rear end of the sleeve 25 to allow relative movement in the axial direction of the rotatable shaft 17 and simultaneous rotation about the shaft 17. The fore open end of the clutch member 22 is closed by a lid plate 31 which is fixed in position by bolts 30 opposingly to the disc 26. A compression spring 32 is provided in position between the lid plate 31 and the flange 25a of the sleeve 25. In small gap relation with the front face of the rotatable disc 26, another disc 33 is fixedly mounted on on the fore end of the rotatable shaft 17 by a nut 34. The disc 33, which has a smaller diameter than that of the disc 26, is provided on its outer periphery with a marking means 35 which is fixed in position by a bolt 36. The marking means 35 has a tip end extended out to or slightly beyond the outer periphery of the rotatable disc 26 while having the other end connected to one end of the flexible tube 37. The flexible tube 37 has its other end connected to a marking ink reservoir (not shown) through an axially extending passage of the hollow rotatable shaft 17 to feed the ink to the marking means 35. A second clutch 38 comprises clutch members 41 and 42 respectively having coupling teeth 39 and 40, one for each on their opposing faces. The clutch member 41 is keyed to the rotatable shaft 17 as at 43 while the clutch member 42 is supported on a sleeve 45 which is in turn rotatably mounted on the rotatable shaft 17 through a bearing 16. An electromagnet support 47 is loosely mounted around the clutch member 41 and fixedly supported on the second pendant bracket 9 by bolts 48 to support an electromagnet 46 in small gap relation with the rear face of the clutch member 41. The inner periphery of the clutch member 42 is splined to flange 45a at one end of the sleeve 45 to allow a relative movement of the clutch member 42 and the sleeve 45 in the axial direction of the rotatable shaft 17 as well as their sumultaneous rotation about the shaft 17. The rear end of the clutch member 42 is closed by a lid plate 50 which is fixed in position by means of bolts 49 opposingly to a flange 45b at the rear end of the sleeve 45, the plate 50 being positioned between two end flanges 45a and 45b of the sleeve 45. A compression spring 51 is interposed between the lid plate 50 and the end flange 45a. The other end flange 45b of the sleeve 45 is fixed to the third pendant bracket 10 by bolts 52. A positioning disc 53 which has a recess on its outer periphery, as shown in FIG. 2, is keyed to the rotatable shaft 17 as at 54 in a position rearward of the third bracket 10. A fluid operated cylinder 56 has its base portion fixedly supported by the rocking plate 3 at a position above the positioning disc 56. The cylinder 56 has a piston rod 57 which has mounted at its fore end a freely rotatable roller 58 for contacting engagement with the recess 55.

There is provided, forwardly of and under the discs 26 and 33, a tire rotating mechanism 60 which comprises a pair of opposing annular flanges 61 and 62 which are adapted to be positively driven for rotation. The upper flange 61 is fixed in the vertical direction and has provided therein a compressed air passage 64 for introducing compressed air into a tire 59 which is to be mounted around the flanges 61 and 62. The lower flange 62 is supported on a cylindrical base 63 movably in the direction of arrows C and C'.

The uniformity-measuring and marking operation by the apparatus of the invention with the construction just described is now discussed following operational sequence.

In a preparatory stage, compressed air is introduced through the passage 64 of the tire rotating mechanism 60 into a tire 59 so as to maintain the tire pressure at a level as in an ordinary running operation on a road.

In the first stage, the clutch members 21 and 22 of the first clutch 18 as well as the clutch members 41 and 42 of the second clutch 38 are disengaged while the fluid cylinder 56 is actuated so as to extend the piston rod 57 toward the positioning disc 53, whereby the roller 58 is brought into contacting engagement with the recess 55 on the outer periphery of the positioning disc 53. The positioning disc 53 causes the rotatable shaft 17 to assume a predetermined stationary position with the marking means 35 in an uppermost position on the outer periphery of the disc 33 pointing upward.

In the second stage, the fluid cylinder 56 is actuated to release the roller 58 from the recess 55. The tire 59 is rotated by the tire rotating mechanism 60 at a speed as in an ordinary running operation on a road. Subsequently, the rocking plate 3 is lowered in the direction of the arrow B' by actuating the fluid cylinder 5 to bring the rotatable disc 26 into pressured contact with a sidewall of the tire 59 for rotation therewith. Simultaneously, a uniformity measuring device, not shown, is brought into contacting engagement with the tire 59. Upon detection of a location of a peak position of non-uniformity of the tire, the measuring device produces a signal to energize the electromagnet 27. Upon energization, the clutch member 22 is attracted by the electromagnet 27 toward the clutch member 21 against the force of the compression spring 32, whereby the coupling teeth 19 and 20 are brought into engagement to couple the first clutch 18. The rotation of the rotatable disc 26 is now transmitted through the sleeve 25, and through the clutch members 22 and 21 to drivingly rotate the rotatable shaft 17 which in turn drives the disc 33. Thus, the marking means 35 makes with its tip a mark on the tire 59 at the peak position in uniformity variation. Because the marking is carried out while the tip of the marking means 35 is moving at a speed same as the peripheral speed of the tire sidewall, the mark produced has a high accuracy and is comparable in precision to the one made on a stationary tire.

The third stage starts when the marking means 35 has been revolved approximately 180° or more. At this moment, a limit switch, not shown, which is provided on the rotatable shaft 17, de-energizes the electromagnet 27 while simultaneously energizing the other electromagnet 46. The first clutch 18 is now disengaged as the clutch members 21 and 22 are separated by the action of the spring 32. Instead, the clutch member 42 is attracted by the energized electromagnet 46 toward the clutch member 41 against the force of the compression spring 51 to bring the coupling teeth 39 and 40 into engagement to thereby couple the second clutch 38. The positions of the coupling teeth 39 and 40 are determined so that the coupling of the second clutch 38 is effected when the marking means 35 has returned to the uppermost position as shown in FIG. 1. The rotation of the shaft 17 is transmitted through the clutch members 41 and 42 and through the sleeve 45 to the third pendant bracket 10. The bracket 10, however, is fixedly attached to the movable plate 3 so that it blocks the rotation of the rotatable shaft 17. Immediately preceding this, the fluid cylinder 56 is actuated to plunge out the piston rod 57, so that the roller 58 is brought into engagement with the recess 55 of the positioning disc 53 simultaneously with the stoppage of the rotation of the shaft 17, followed by de-energization of the electromagnet 46, thus holding the disc 33 and the marking means 35 to the predetermined rest positions through the shaft 17. The timing for actuating the fluid cylinder 56 and uncoupling the second clutch 38 is dictated by a limit switch, not shown, which is provided on the rotatable shaft 17.

After finishing the marking operation, the rocking plate 3 is raised in the direction of the arrow B by actuating the fluid cylinder 5, whereby the rotatable disc 26 is also raised away from the sidewall of the marked tire 59. In this instance, the uniformity measuring device is simultaneously removed from the tire surface. After stopping the tire rotating mechanism 60, the marked tire 59 may be dismounted therefrom by lowering the flange 62 in the direction of the arrow C', thus completing one cycle of the uniformity measurement and simultaneous tire marking operation. The measurement and the marking on a number of tires can be carried out in a successive manner by repeating the operation cycle just described.

The marking means 35 is shown in the afore-described embodiment as being supplied with a marking ink from an ink reservoir through a flexible tube 37 which delivers the ink through the axially-extending passage in the rotary shaft 17. Alternatively, the marking means may be adapted to be supplied with a marking ink directly from a container which is mounted at the center portion of the disc 33. The tip end portion of the marking means 35 nevertheless must be at the same position as in the preceding preferred embodiment. The rotatable shaft 17 and other main component parts of the apparatus are illustrated herein as being supported on the rocking plate 3 by the brackets 8 to 10 for rocking movement therewith. The marking assembly, however, may be moved into and out of the operative position in any other manner. Furthermore, the marking means 35 is herein shown as being held in the uppermost rest position by the positioning disc 54 which is fixedly attached to the rotatable shaft 17 and by the cooperative action of the fluid cylinder 56 which is fixedly supported on the rockable plate 3. Alternatively, the marking means 35 may be held in the rest position by a positioning means which is provided at the extended fore end portion of the rocking plate 3. In such a case, the fore end of the rocking plate 3 should preferably be extended further to a position immediately above the marking means 35. Moreover, the constructions of the first and second clutches 18 and 38 are illustrated in the foregoing description and the drawings by way of example only, and are susceptible to various changes or alterations within the scope of the invention as described in the appended claims.

The apparatus according to the invention with the construction just described has an advantage in that the marking means is adapted to travel perpendicularly with respect to the tire surface so that a clear mark in the form of a point is printed at an accurate position on the tire. Another advantage of the invention resides in its construction which allows synchronization of the marking means movement with the peripheral speed of a tire under the uniformity measurement, thus carrying out the marking operation without reducing the rotational speed of the tire to enhance the marking efficiency. Still another advantage of the invention is its simple construction which will reduce the production costs and simplify the apparatus maintenance and adjustments.

What is claimed is:

1. An apparatus for printing a mark on a rotating vehicle tire under uniformity test by a uniformity measuring device, said apparatus comprising:
   a rotary shaft rotatably supported on a bracket;
   a first disc member securely mounted at one end of said rotary shaft for rotation therewith;
   a second disc member freely rotatably mounted on said rotary shaft inwardly of said first disc member and adapted to be brought into pressing contact with a tire under measurement;
   a marking means securely mounted on said first disc member and having the fore end thereof radially outwardly projected to assume a radial position corresponding to or slightly beyond the outer periphery of said second disc member;
   a first clutch means mounted on said rotary shaft for coupling said second disc member and said rotary shaft in response to a signal from said measuring device;
   a second clutch means mounted on said rotary shaft and said bracket for coupling said rotary shaft and said bracket when said marking means returns to a stand-by position on said first disc member; and
   a positioning means for holding said marking means in said stand-by position.

2. The apparatus as set forth in claim 1, wherein said first clutch means includes:
   a first coupling member keyed to said rotary shaft for rotation therewith and having mounted thereon an electromagnet; and
   a second coupling member rotatable with said second disc member and normally biased to assume a position disengaged from said first coupling member;
   said electromagnet being energized in response to a signal from said measuring device to engage said first and second coupling members, thereby coupling said second disc member and said rotary shaft.

3. The apparatus as set forth in claim 2, wherein said second coupling member is biased to assume a position disengaged from said second coupling member by the action of a compression spring.

4. The apparatus as set forth in claim 1, wherein said second clutch means includes:
   a first coupling member keyed to said rotary shaft for rotation therewith and having mounted thereon an electromagnet; and
   a non-rotatable second coupling member splined to a fixed sleeve and normally biased to assume a position disengaged from said first coupling member;
   said electromagnet of said first coupling member being energized at a predetermined timing for engaging said first and second coupling members when said marking means returns to said stand-by position.

5. The apparatus as set forth in claim 1, wherein said positioning means includes:
   a disc plate keyed to said rotary shaft for rotation therewith and having circumferentially formed therewith a recess;
   a fluid operated cylinder fixed at the bottom end thereof and having a roller at the fore end of a piston rod for engagement with said recess of said disc plate for holding said marking means in said stand-by position through said rotary shaft.

6. The apparatus as set forth in claim 1, wherein said rotary shaft is supported on three brackets pending from a support structure which is pivotally supported on a machine frame for moving said second disc member toward and away from said tire under measurement.

7. The apparatus as set forth in claim 6, further comprising a fluid operated cylinder fixed at the bottom end and having a piston rod connected to said support structure for imparting rocking mevement thereto.

8. The apparatus as set forth in claim 1, wherein said marking means is supplied with a marking ink from an ink reservoir through a flexible tube which is passed through an axial passage in said rotary shaft.

9. The apparatus as set forth in claim 1, wherein said marking means is supplied with a marking ink from an ink container which is fixedly mounted in a center portion of said first disc member.

* * * * *